United States Patent
Goyal et al.

(10) Patent No.: US 10,688,408 B2
(45) Date of Patent: Jun. 23, 2020

(54) DIVIDING WALL COLUMN WITH VAPOR SEPARATION

(71) Applicant: UOP LLC, Des Plaines, IL (US)

(72) Inventors: Amit Goyal, Haryana (IN); Sudipta Ghosh, Haryana (IN); Joe R. Haas, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/046,149

(22) Filed: Jul. 26, 2018

(65) Prior Publication Data

US 2020/0030714 A1    Jan. 30, 2020

(51) Int. Cl.
*B01D 3/14* (2006.01)
*C10G 7/12* (2006.01)
*C10G 7/00* (2006.01)
*B01D 3/42* (2006.01)

(52) U.S. Cl.
CPC ........... *B01D 3/141* (2013.01); *B01D 3/4261* (2013.01); *C10G 7/00* (2013.01); *C10G 7/12* (2013.01)

(58) Field of Classification Search
CPC ..................................................... B01D 3/141
See application file for complete search history.

(56) References Cited

U.S. PATENT DOCUMENTS

| 4,230,533 A | 10/1980 | Giroux |
| 6,558,515 B1 | 5/2003 | Steacy |
| 8,562,792 B2 | 10/2013 | King et al. |

FOREIGN PATENT DOCUMENTS

| CN | 102872609 B | 4/2015 |
| CN | 106823439 A | 6/2017 |
| EP | 2394723 A2 | 12/2011 |
| KR | 101709754 B1 | 2/2017 |
| WO | 2004071618 A1 | 8/2004 |

OTHER PUBLICATIONS

Ki Joon Kang, et al., Hydraulic Driven Active Vapor Distributor for Enhancing Operability of a Dividing Wall Column, Ind. Eng. Chem. Res. 2017, 56, 6493-6498.
International Search Report from PCT application No. PCT/US2019/042536, dated Nov. 7, 2019.
Written Opinion from PCT application No. PCT/US2019/042536, dated Oct. 7, 2019.

*Primary Examiner* — Renee Robinson

(57) ABSTRACT

An apparatus for separating a feed stream into product streams. The apparatus includes an upper section, a middle section, and a lower section. The middle section has a dividing wall separating it into two portions. A liquid barrier blocks the flow of liquid from the upper section into the middle section and allows vapor to flow from the middle section to the upper section. A vapor and liquid barrier blocks both the flow of both vapor from the lower section to the middle section and the flow of liquid from the middle section to the lower section. Vapor conduits allow vapor to flow from the lower section to each of the middle portions in varying amounts. Also processes for separating a feed stream.

20 Claims, 2 Drawing Sheets

DIVIDING WALL COLUMN WITH VAPOR SEPARATION

FIELD OF THE INVENTION

Figure 1:
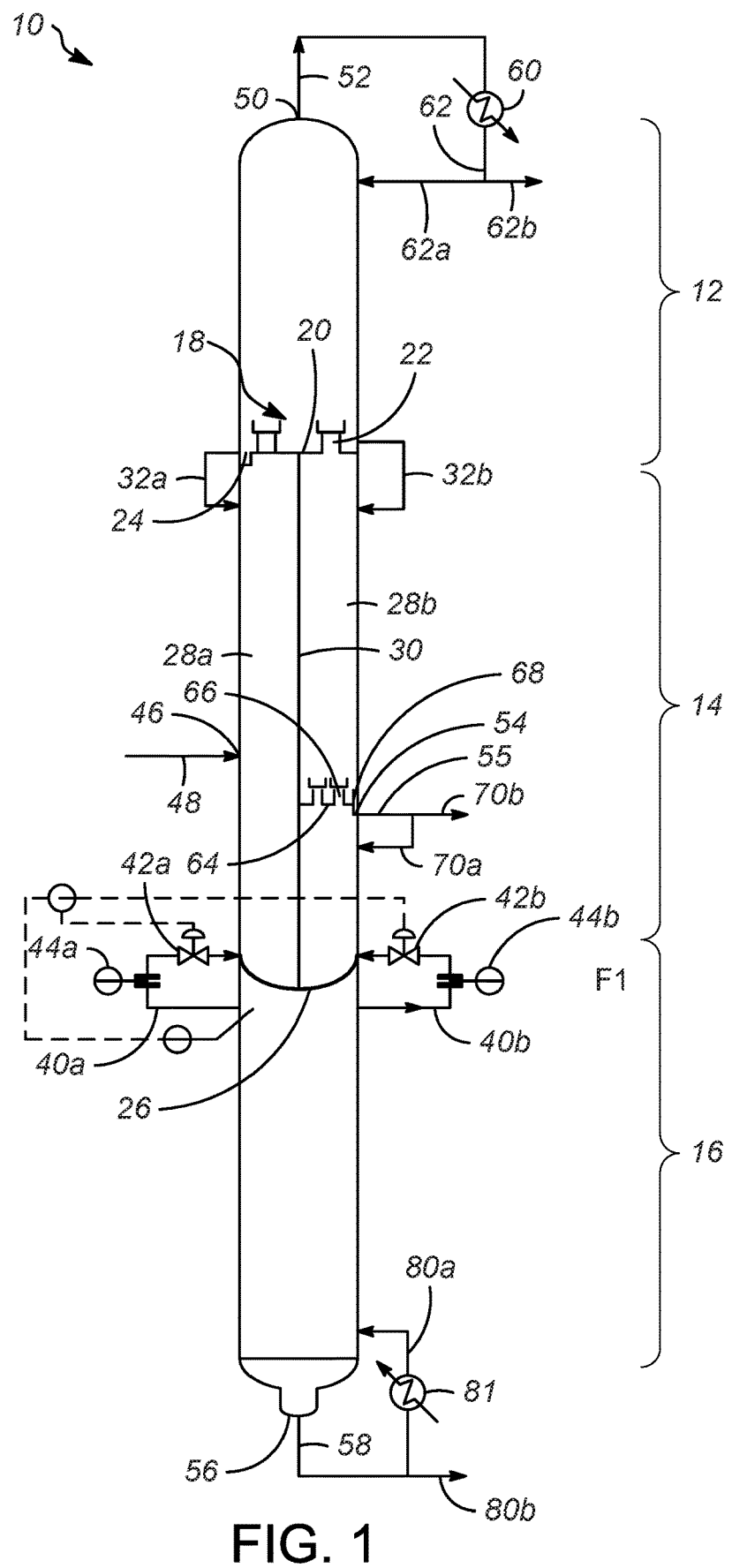

This invention relates generally to dividing wall distillation columns and processes using the columns, for performing fractional distillation of an impure feed (e.g., comprising hydrocarbon components having a range of carbon atom numbers and boiling points).

BACKGROUND OF THE INVENTION

Distillation accounts for a significant amount of the overall energy usage in many industries, including crude oil refining and petrochemical production. Although over 40,000 distillation columns are used in a broad range of commercial applications, distillation in general is nevertheless characterized as having a low energy efficiency.

Distillation is a separation process that exploits differences (sometimes minor) in component relative volatilities or boiling points. Generally, a high degree of purity of component A (e.g., propane, having three carbon atoms) and component B (e.g., n-butane, having four carbon atoms) can be achieved by distilling an impure mixture of these components. This assumes that the distillation column used provides, in view of the relative volatility difference, a sufficient number of theoretical stages of vapor-liquid equilibrium contacting and that an azeotropic mixture of the components is not formed at a composition below the desired purity.

When separating a mixture of three components A, B, and C (or three fractions that may themselves be mixtures of components) at least two distillation columns are typically used; however, each column is only capable of separating a feed stream into two product streams, namely an overhead product enriched in the lower boiling component(s) and a bottoms product enriched in the higher boiling component(s).

An alternative to the use of two separate distillation columns for separating a mixture into three component streams is a dividing-wall column (DWC). A single DWC can replace the conventional two columns in series designs. Typically, the DWC has a lower energy consumption compared to the conventional two columns in series designs. An exemplary DWC is disclosed in U.S. Pat. No. 8,562,792, the entirety of which is incorporated herein by reference.

Despite being presumably effective for their intended purposes, a drawback of some DWC designs is the inability to effectively and efficiently control/split vapor flows across the two sides of the dividing wall. Current solutions to control/split vapor flows include adjusting the position of the dividing wall such that the required vapor flow is achieved on the two sides of the dividing wall by hydraulic pressure drop through the parallel paths on each side of the dividing wall. However, this arrangement poses a limitation, because it does not allow for the vapor flow to be adjusted whenever there is a substantial expected feed composition change or with any process objectives that results in a large, required vapor flow variation on either side of partition/dividing wall. Thus, since the pressure drop on either side of the walled sections is same, there are limitations in the application of DWCs—especially in cases where the flow up through each of the divided sections is must vary.

Therefore, it would be desirable to provide a DWC that does not suffer from these drawbacks and provides a process for separating hydrocarbons in which vapor passed to both sides of the dividing wall may be controlled and varied.

SUMMARY OF THE INVENTION

The DWC according to the present invention provides controllable and adjustable vapor flow control on either side of the dividing wall with control valves. This is achieved while retaining a single column configuration by separating the lower and middle portions of the column with a vapor and liquid barrier. With the improved vapor flow control through the dividing wall section, wider application of DWC is believed to be achieved—especially for cases where flow variation on either side of the dividing wall is expected.

The ability to split the total amount of vapors from the bottom section to the two portions of middle section in an adjustable ratio allows the DWC to meet process objectives of separation. This split of vapors is achieved by providing a physical separation of the DWC section with the dividing wall and the lower section using a bottom head between the two sections. This allows the two sections to operate at different pressures.

The benefits of the present invention include the ability to use a DWC even in situations in which there are large feed composition changes or in situations in which the process objectives change, resulting in large, necessary vapor flow variations on either side of partition. Furthermore, installation of the DWC according to the present invention in existing systems where the dividing wall is at a fixed location, provide the ability to control liquid/vapor rates in the two opposing sections of the portion of the DWC with the dividing wall in the desired ratio based on feed quantity/composition.

Therefore, the present invention may be characterized, in at least one aspect, as providing an apparatus for separating a feed composition comprising a plurality of components comprising: an upper section, a middle section and a lower section. The middle section may comprise a dividing wall separating the middle section into two portions. Each of the two portions of the middle section may be separated from the upper section by a liquid barrier configured to block a flow of liquid from the upper section into the middle section. The liquid barrier is further configured to allow for vapor to flow from the middle section to the upper section. The lower section may be separated from the middle section by a vapor and liquid barrier configured to block both a flow of vapor from the lower section to the middle section and a flow of liquid from the middle section to the lower section.

It is contemplated that the apparatus further includes at least one vapor conduit providing vapor flow from the lower section to the middle section. The apparatus may also include at least one liquid conduit providing liquid flow from the middle section to the lower section.

It is contemplated that the apparatus further includes a first vapor conduit providing vapor flow from the lower section to a first portion of the middle section, and a second vapor conduit providing vapor flow from the lower section to a second portion of the middle section. The apparatus may also include a first control valve disposed in the first vapor conduit, and a second control valve disposed in the second vapor conduit. The first and second control valves may be configured to be operated independently of each other.

In at least one other aspect, the present invention may be broadly characterized as providing a dividing wall column comprising three sections. A first section includes a tray for collecting a first liquid. A second section may be disposed below the first section and includes two portions separated from each other by a wall. The tray of the first section is configured to block the first liquid from flowing from the first section into either of the two portions of the second section. The third section is separated from the second section by a solid vapor and liquid barrier configured to block a flow of vapor from the third section to the second section and block a flow of liquid from the second section to the third section.

It is contemplated that the dividing wall column also includes a first vapor conduit providing vapor flow from the third section to a first portion of the second section, and a second vapor conduit providing vapor flow from the third section to a second portion of the second section. The dividing wall column may also include a first control valve disposed in the first vapor conduit and a second control valve disposed in the second vapor conduit. The first and second control valves may be configured to operate independently of each other. It is further contemplated that the dividing wall column includes at least one liquid conduit for providing liquid from the second section to the third section.

It is further contemplated that the dividing wall column a first outlet in the first section for a first product stream. It is contemplated, that a first portion of the second section further includes an inlet for a feed composition, and a second portion of the second section further includes a second outlet for a second product stream. The third section may include a third outlet for a third product stream.

In yet another aspect of the present invention, the present invention may be generally characterized as a providing a process for separating a hydrocarbon feed stream comprising at least three different components into at least three product streams by: passing the hydrocarbon feed stream into a middle section of a dividing wall distillation column, the dividing wall distillation column further comprising an upper section disposed above the middle section and a lower section disposed below the lower section, and the middle section separated into two portions by a wall extending through the middle section from the upper section to the lower section; blocking a flow of liquid from the upper section to the middle section with a liquid barrier; blocking both a flow of liquid from the middle section to the lower section and a flow of vapor from the lower section to the middle section with a vapor and liquid barrier; recovering a first product stream from the upper section; recovering a second product stream from the middle section; and, recovering a third product stream from the lower section.

It is contemplated that the hydrocarbon feed stream is passed into one of the two portions of the middle section, and wherein the second product stream is recovered from the other of the two portions of the middle section.

It is contemplated that a vapor is passed from the lower section to the middle section with at least two vapor flow conduits. A first vapor flow conduit may pass the vapor from the lower section to the first portion of the middle section, and the second vapor flow conduit may pass the vapor from the lower section to the second portion of the middle section. A pressure of the first portion may different than a pressure of the second portion.

It is contemplated that process also includes sensing at least one parameter of the process and generating a signal or data from the sensing; generating and transmitting a signal; or generating and transmitting data.

Additional aspects, embodiments, and details of the invention, all of which may be combinable in any manner, are set forth in the following detailed description of the invention.

DETAILED DESCRIPTION OF THE DRAWINGS

Figure 2:
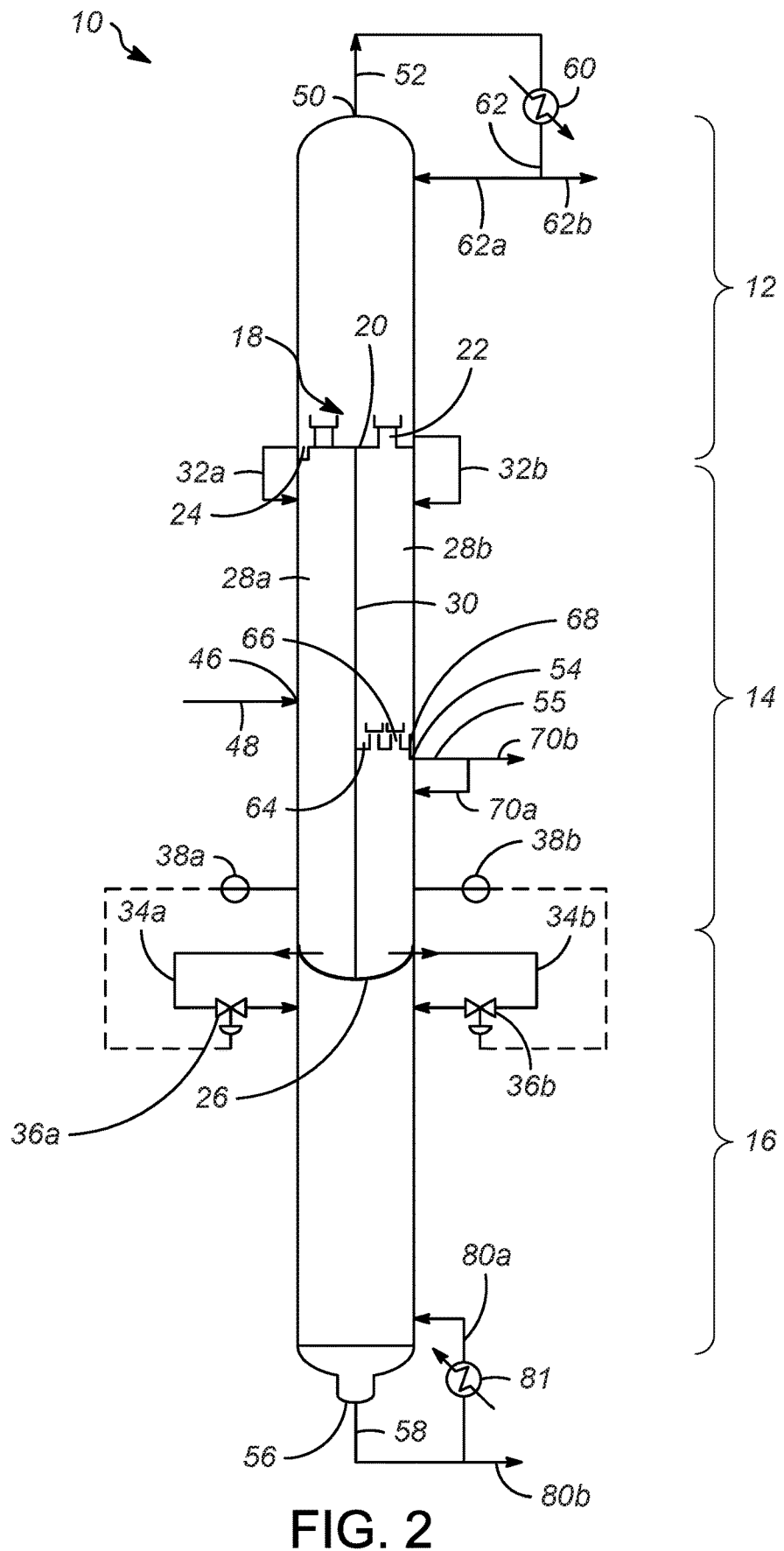

One or more exemplary embodiments of the present invention will be described below in conjunction with the following drawing figures, in which:

FIG. 1 a side, cut view of an exemplary dividing wall distillation column according to an embodiment of the present invention; and, FIG. 2 shows a second side, cut view of the exemplary dividing wall distillation column shown in FIG. 1.

DETAILED DESCRIPTION OF THE INVENTION

As mentioned above, the present invention provides a dividing wall column for separating a feed composition comprising a plurality of components by distillation. Generally, the dividing wall column includes three sections, namely, a first or upper section, a second or middle section, and a third or bottom section. The middle section is separated in half, from top to bottom, by a dividing wall. Both portions of the middle section are separated from the lower section by a barrier which precludes vapor and liquid from flowing directly between the two sections. Rather, vapor conduits transfer vapor from the lower section to both portions of the middle section, and liquid conduits transfer liquid form the middle section to the lower section. This configuration allows for the amount of vapor transferred to the two portions of the middle section to be controlled and adjusted to accommodate, for example, changes in feed composition.

With these general principles in mind, one or more embodiments of the present invention will be described with the understanding that the following description is not intended to be limiting.

With reference to both FIGS. 1 and 2, a dividing wall distillation column 10 according to a representative embodiment of the invention is shown. The dividing wall distillation column 10 may be used in the fractional distillation of a feed comprising a number of different compounds (e.g., hydrocarbon compounds as well as non-hydrocarbon compounds like oxygenates such as alcohols, ketones, and ethers) into an (i) overhead product enriched in one or more low boiling compounds present in the feed, (ii) a bottoms product enriched in one or more high boiling compounds present in the feed, and (iii) a sidecut product enriched in one or more intermediate boiling compounds present in the feed. The term "enriched" in a compound refers to a higher concentration of that compound in the product, relative to the feed. The dividing wall distillation column 10 may be employed to perform a wide variety of fractionation operations, particularly in the petroleum and petrochemical industries. These include the separation of hydrocarbons (e.g., having from about 4 to about 12 carbon atoms) or other non-hydrocarbon compounds of a feed into fractions having a similar relative volatility or boiling point. Product fractions can include crude oil-derived products of petroleum refining and petrochemical processing, such as naphtha, diesel fuel, kerosene, and liquefied petroleum gas (LPG). In some cases, fractions can be specific compounds, or specific types of compounds, separated from others of the same chemical or functional class, for example alcohols, ethers, alkylaromatics, monomers, solvents, inorganic compounds, etc.

The dividing wall distillation column 10 includes three sections, a first or upper section 12, a second or middle section 14, and a third or bottom section 16. For simplicity, conventional vapor-liquid contacting devices such as trays or packing materials are not shown in FIGS. 1 and 2, although these contacting devices are present throughout the three sections 12, 14, 16.

The column 10 also includes a liquid barrier 18 separating the upper section 12 and the middle section 14. The liquid barrier 18 comprises a first solid tray portion 20, which can include multiple tray sections, for blocking internal, downward liquid flow from the upper section 12 to the middle section 14 across all or substantially all of the cross section of the column 10. At the same time, vapor from the middle section 14 may rise and pass through the liquid barrier 18 and into the upper section 12.

Accordingly, the liquid barrier 18 may include one or more vertically extending, capped upper vapor risers 22. As shown in FIGS. 1 and 2, the liquid barrier 18 is not necessarily coplanar, but may include features such as upper vapor risers 22 and/or collection well 24, extending above and/or below the plane of the solid tray portion 20. According to a particular embodiment, the liquid barrier 18 comprises a solid tray, such as a chimney tray, extending over a circular cross section of the column and further comprises a plurality of vapor risers.

The dividing wall distillation column 10 also includes a vapor and liquid barrier 26 separating the middle section 14 from the lower section 16. The vapor and liquid barrier 26 blocks substantially all of both the internal, upward flow of vapor from the lower section 16 to the middle section 14 and the internal, downward flow of liquid from the middle section 14 to the lower section 16. The vapor and liquid barrier 26 preferably comprises a solid wall, or bulkhead, that may be curved, as depicted. Other configurations are contemplated. Additionally, the vapor and liquid barrier 26 preferably has sufficient structural integrity to allow for a pressure differential to exist between the middle section 14 and the lower section 16.

In the dividing wall distillation column 10, the middle section 14 is divided into two portions 28a, 28b by a dividing wall 30 extending along a longitudinal axis of the column 10. The two portions 28a, 28b preferably extend parallel to each other and the longitudinal axis of the column 10. The wall 30 extends from the liquid barrier 18 to the vapor and liquid barrier 26 to provide the two portions 28a, 28b.

Additionally, as shown in the depicted embodiment the column 10, includes upper liquid conduits 32a, 32b which may be used to provide liquid flow from above upper section 12, around the liquid barrier 18, to the portions 28a, 28b of the middle section 14. The upper liquid conduits 32a, 32b are preferably external to the column 10 and thereby readily controlled using control valves and flow measurement systems (not shown). The material in liquid conduits 32a, 32b may be conveyed to the portions 28a, 28b of the middle section 14 using pumps (not shown) or otherwise via gravity in the case of a free draining system. Conduits 32a, 32b normally terminate at liquid flow distributors (not shown) within the column 10.

Similarly, as shown in FIG. 2, the column 10 also includes lower liquid conduits 34a, 34b which may be used to provide liquid flow from the middle section 14, around the vapor and liquid barrier 26, to the lower section 16. The lower liquid conduits 34a, 34b are preferably external to the column 10 and thereby readily controlled using control valves 36a, 36b and level indicators 38a, 38b. The material in liquid conduits 32a, 32b may be conveyed to the lower section 16 using pumps (not shown) or otherwise via gravity in the case of a free draining system. Lower liquid conduits 34a, 34b normally terminate at liquid flow distributors (not shown) within the column 10. The control valves 36a, 36b help to maintain a pressure seal between the middle section 14 and the lower section 16.

Returning to FIG. 1, in order to bypass the vapor and liquid barrier 26 and provide for vapor flow between the portions 28a, 28b of the middle section 14 and the lower section 16 of the column 10, the column 10 includes vapor conduits 40a, 40b or lines for vapor streams. The vapor conduits 40a, 40b are preferably external to the column 10. Each vapor conduit 40a, 40b may include a control valve 42a, 42b allowing the flow of vapor to be regulated. The control valves 42a, 42b preferably are configured to be operated independently of each other allowing different amounts of vapor to be passed from the lower section 16 to the portions 28a, 28b of the middle section 14. The vapor flow rates through each of the control valves 42a, 42b may be monitored by instrumentation, such as with flow indicators 44a, 44b, for example which measures a pressure drop across each of the control valves 42a, 42b. The control valves control valve 42a, 42b preferably are configured to be operated independently of each other allowing different amounts of vapor to be passed from the lower section 16 to the portions 28a, 28b of the middle section 14. Vapor conduits 40a, 40b normally terminate at vapor flow distributors (not shown) within the column 10.

The column 10 also comprises an inlet 46 for a feed stream 48, a first outlet 50 for an overhead stream 52, a second outlet 54 for a sidecut stream 55, and a third outlet 56 for a bottoms stream 58. This is merely exemplary and other configurations may be used for the dividing wall distillation column 10. For example, the dividing wall distillation column 10 may include multiple inlets for the feed stream 48. Similarly, the dividing wall distillation column 10 may include additional outlets for additional product streams, for example, a second outlet in the middle section 14 for a second sidecut stream.

As depicted in FIGS. 1 and 2, the first outlet 50 is associated with the upper section 12 of the dividing wall distillation column 10. As is known, the overhead stream 52 may be passed through a condenser 60 to provide a liquid stream 62, a portion 62a of which passed back to the upper section 12 of the dividing wall distillation column 10 as a reflux, while a second portion 62b is recovered as a first product stream. The condenser 60 may be an external condenser (as shown) or the condenser 60 may be an internal condenser. Additionally, multiple condensers 60 may be used, as well as the same or different types of condensers 60 (e.g., air and water cooled condensers) to control, in conjunction with an overhead receiver or reflux drum (not shown) and an overhead reflux pump, flow device, and control valve (not shown) (i) the extent of condensation of vapor removed from the upper section 12, (ii) the extent of condensed liquid returned to the dividing wall distillation column 10, and the first product stream withdrawn from, the upper section 12, and (iii) the column 10 temperature in the upper section 12.

In the exemplary dividing wall distillation column 10 of the present invention, the inlet 46 and the second outlet 54 are associated with the middle section 14 of the column 10. Preferably, the inlet 46 is associated with the first portion 28a of the middle section 14, while the second outlet 54 is associated with the second portion 28b of the middle section 14. The second portion 28b may include a tray 64 for collecting liquid, such as chimney tray with system vapor risers 66 and a sidecut collection well 68. The sidecut stream 55 may also be passed, as is known, through a condenser (not shown) to provide a condensed sidecut stream. A portion 70a of the condensed sidecut stream 70 may be passed back to the column as a reflux stream. A second portion 70b of the condensed sidecut stream is recovered as a second product stream.

Finally, as shown in the depicted column 10 of FIGS. 1 and 2, the third outlet 56 is associated with the lower section 16 of the column 10. As is known, first portion 80a of the bottoms stream 58 is returned to the column 10, while a second portion 80b is recovered as a third product stream. The first portion 80a of the bottoms stream 58 may be passed to through a bottoms liquid reboiling system that includes bottoms reboiler 81, which may be an external reboiler or an internal reboiler. One or multiple reboilers 81 may be used, as well as the same or different types of reboilers 81 to control, in conjunction with a bottoms circulation control valve (not shown) (i) the extent of vaporization of liquid removed from lower section 16, (ii) the extent of vaporized liquid returned to, and bottoms product withdrawn from, lower section 16, and (iii) the column 10 temperature in this section. Other measurement systems (e.g., for temperature measurement) may be used in the overhead liquid condensation and reflux system and/or the bottoms liquid reboiling system, often as part of a control loop.

Embodiments of the invention are therefore directed to fractionation methods comprising passing the feed stream 48 comprising, for example, hydrocarbons or other compounds as described above into the column 10 depicted in FIGS. 1 and 2 and described above. Representative methods further comprise blocking all or substantially all of a downward liquid flow from the upper section 12 of the column 10 to the middle section 14 of the column 10 with a liquid barrier 18. The methods also comprise blocking all or substantially all of upward vapor flow from the lower section 16 the column 10 to the middle section 14 and also blocking all or substantially all of downward liquid flow from the middle section 14 to the lower section 16 with the vapor and liquid barrier 26. The methods include passing a first vapor stream 40a from the bottoms section 16 to the first portion 28a of the middle section 14 and a passing a second vapor stream 40b from the bottom section 16 to the second portion 28b of the middle section 14. The amounts of the vapor in the first and second vapor stream 40a, 40b may be adjusted based on changes in feed stream 48 composition which require flow variation between the two portions 28a, 28b of the middle section 14 for effective and efficient separation into the product streams 62b, 70b, 80b. The methods may also include adjusting the flow of the vapor streams 40a, 40b independently from each other. The methods may further comprise withdrawing (i) a first or overhead stream 52, enriched in low boiling hydrocarbons, from the column 10 above the liquid barrier 18, (ii) withdrawing a second or sidecut stream 55, enriched in intermediate boiling hydrocarbons, from the middle section 14 of the column 10, and (iii) withdrawing a third or bottoms stream 58, enriched in high boiling hydrocarbons, from the column 10 below the vapor and liquid barrier 26 of the column 10.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

For example, upon receiving a signal or data relating to the composition of the feed stream 48, or a level in one of the portions 28a, 28b of the middle section 14, a computing device or system may be configured to send a signal to the control valves 42a, 42b in the vapor conduits 40a, 40b to adjust the amount of vapor flowing into one or both of the portions 28a, 28b of the middle section 14. The control valves 42a, 42b in the vapor conduits 40a, 40b may be in communication with a computing device (not shown), with for example radio transmitters and receivers. The computer device may be configured to send signals to the control valves 42a, 42b to adjust the ratio of vapor flowing into the two portions 28a, 28b of the middle section 14. The adjustment of the control valves 42a, 42b may be to achieve a desired ratio or it can be a responsive adjustment not based on achieving a desired ratio, but based on one or more processing conditions that are detected or determined to be present, such as a feed composition, a product composition, a temperature, a pressure, a level, or the like.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus for separating a feed composition comprising a plurality of components, the apparatus comprising an upper section; a middle section, the middle section comprising a dividing wall separating the middle section into two portions, each of the two portions of the middle section being separated from the upper section by a liquid barrier configured to block a flow of liquid from the upper section into the middle section and the liquid barrier configured to allow for vapor to flow from the middle section to the upper section; and, a lower section, the lower section separated from the middle section by a vapor and liquid barrier configured to block both a flow of vapor from the lower section to the middle section and a flow of liquid from the middle section to the lower section. An embodiment of the invention is one, any or all of prior embodiments in this paragraph up through the first embodiment in this paragraph further comprising at least one vapor conduit providing vapor flow from the lower section to the middle section. An embodiment of the invention is one, any or all of prior embodiments in this paragraph up through the first embodiment in this paragraph further comprising at least one liquid conduit providing liquid flow from the middle section to the lower section. An embodiment of the invention is one, any or all of prior embodiments in this paragraph up through the first embodiment in this paragraph further comprising a first vapor conduit providing vapor flow from the lower section to a first portion of the middle section; and, a second vapor conduit providing vapor flow from the lower section to a second portion of the middle section. An embodiment of the invention is one, any or all of prior embodiments in this paragraph up through the first embodiment in this paragraph further comprising a first control valve disposed in the first vapor conduit; and, a second control valve disposed in the second vapor conduit. An embodiment of the invention is one, any or all of prior embodiments in this paragraph up through the first embodiment in this paragraph, wherein the first and second control valves are configured to operate independently of each other.

A second embodiment of the invention is a dividing wall distillation column comprising a first section having a tray for collecting a first liquid; a second section disposed below the first section, the second section comprising two portions separated from each other by a wall, wherein the tray of the first section is configured to block the first liquid from flowing from the first section into either of the two portions of the second section; and, a third section separated from the second section by a solid vapor and liquid barrier configured to block a flow of vapor from the third section to the second section and block a flow of liquid from the second section to the third section. An embodiment of the invention is one, any or all of prior embodiments in this paragraph up through the second embodiment in this paragraph further comprising a first vapor conduit providing vapor flow from the third section to a first portion of the second section; and, a second vapor conduit providing vapor flow from the third section to a second portion of the second section. An embodiment of the invention is one, any or all of prior embodiments in this paragraph up through the second embodiment in this paragraph further comprising a first control valve disposed in the first vapor conduit; and, a second control valve disposed in the second vapor conduit. An embodiment of the invention is one, any or all of prior embodiments in this paragraph up through the second embodiment in this paragraph, wherein the first and second control valves are configured to operate independently of each other. An embodiment of the invention is one, any or all of prior embodiments in this paragraph up through the second embodiment in this paragraph further comprising at least one liquid conduit for providing liquid from the second section to the third section. An embodiment of the invention is one, any or all of prior embodiments in this paragraph up through the second embodiment in this paragraph, wherein the first section further comprises a first outlet for a first product stream. An embodiment of the invention is one, any or all of prior embodiments in this paragraph up through the second embodiment in this paragraph, wherein a first portion of the second section further comprises an inlet for a feed composition, and a second portion of the second section further comprises a second outlet for a second product stream. An embodiment of the invention is one, any or all of prior embodiments in this paragraph up through the second embodiment in this paragraph, wherein the third section further comprises a third outlet for a third product stream.

A third embodiment of the invention is a process for separating a hydrocarbon feed stream comprising at least three different components into at least three product streams, the process comprising passing the hydrocarbon feed stream into a middle section of a dividing wall distillation column, the dividing wall distillation column further comprising an upper section disposed above the middle section and a lower section disposed below the lower section, and the middle section separated into two portions by a wall extending through the middle section from the upper section to the lower section; blocking a flow of liquid from the upper section to the middle section with a liquid barrier; blocking both a flow of liquid from the middle section to the lower section and a flow of vapor from the lower section to the middle section with a vapor and liquid barrier; recovering a first product stream from the upper section; recovering a second product stream from the middle section; and, recovering a third product stream from the lower section. An embodiment of the invention is one, any or all of prior embodiments in this paragraph up through the third embodiment in this paragraph, wherein the hydrocarbon feed stream is passed into one of the two portions of the middle section, and wherein the second product stream is recovered from the other of the two portions of the middle section. An embodiment of the invention is one, any or all of prior embodiments in this paragraph up through the third embodiment in this paragraph wherein a vapor is passed from the lower section to the middle section with at least two vapor flow conduits. An embodiment of the invention is one, any or all of prior embodiments in this paragraph up through the third embodiment in this paragraph wherein a first vapor flow conduit passes the vapor from the lower section to the first portion of the middle section, and wherein the second vapor flow conduit passes the vapor from the lower section to the second portion of the middle section. An embodiment of the invention is one, any or all of prior embodiments in this paragraph up through the third embodiment in this paragraph wherein a pressure of the first portion is different than a pressure of the second portion. An embodiment of the invention is one, any or all of prior embodiments in this paragraph up through the third embodiment in this paragraph, further comprising at least one of sensing at least one parameter of the process and generating a signal or data from the sensing; generating and transmitting a signal; or generating and transmitting data.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An apparatus for separating a feed composition comprising a plurality of components, the apparatus comprising:
    an upper section;
    a middle section, the middle section comprising a dividing wall separating the middle section into two portions, each of the two portions of the middle section being separated from the upper section by a liquid barrier configured to block a flow of liquid from the upper section into the middle section and the liquid barrier configured to allow for vapor to flow from the middle section to the upper section; and,
    a lower section, the lower section separated from the middle section by a vapor and liquid barrier configured to block both a flow of vapor from the lower section to the middle section and a flow of liquid from the middle section to the lower section such that a pressure in a first portion of the middle section is independent of a pressure in a second portion of the middle section,
    wherein the dividing wall precludes liquid accumulating on a top of the vapor and liquid barrier within the two portions of the middle section from mixing.

2. The apparatus of claim 1 further comprising:
    at least one vapor conduit providing vapor flow from the lower section to the middle section.

3. The apparatus of claim 2 further comprising:
    at least one liquid conduit providing liquid flow from the middle section to the lower section.

4. The apparatus of claim 1 further comprising:
    a first vapor conduit providing vapor flow from the lower section to the first portion of the middle section; and,
    a second vapor conduit providing vapor flow from the lower section to the second portion of the middle section.

5. The apparatus of claim 4 further comprising:
    a first control valve disposed in the first vapor conduit; and,
    a second control valve disposed in the second vapor conduit.

6. The apparatus of claim 5, wherein the first and second control valves are configured to operate independently of each other.

7. A dividing wall distillation column comprising:
    a first section having a tray for collecting a first liquid;
    a second section disposed below the first section, the second section comprising two portions separated from each other by a wall, wherein the tray of the first section is configured to block the first liquid from flowing from the first section into either of the two portions of the second section; and,
    a third section separated from the second section by a solid vapor and liquid barrier configured to block a flow of vapor from the third section to the second section and block a flow of liquid from the second section to the third section such that a pressure in a first portion of the second section is independent of a pressure in a second portion of the second section,
    wherein the dividing wall precludes liquid accumulating on a top of the vapor and liquid barrier within the two portions of the middle section from mixing.

8. The dividing wall distillation column of claim 7 further comprising:
    a first vapor conduit providing vapor flow from the third section to the first portion of the second section; and,
    a second vapor conduit providing vapor flow from the third section to the second portion of the second section.

9. The dividing wall distillation column of claim 8 further comprising:
    a first control valve disposed in the first vapor conduit; and,
    a second control valve disposed in the second vapor conduit.

10. The dividing wall distillation column of claim 9, wherein the first and second control valves are configured to operate independently of each other.

11. The dividing wall distillation column of claim 8 further comprising:
    at least one liquid conduit for providing liquid from the second section to the third section.

12. The dividing wall distillation column of claim 7, wherein the first section further comprises a first outlet for a first product stream.

13. The dividing wall distillation column of claim 12, wherein the first portion of the second section further comprises an inlet for a feed composition, and the second portion of the second section further comprises a second outlet for a second product stream.

14. The dividing wall distillation column of claim 13, wherein the third section further comprises a third outlet for a third product stream.

15. A process for separating a hydrocarbon feed stream comprising at least three different components into at least three product streams, the process comprising:
    passing the hydrocarbon feed stream into a middle section of a dividing wall distillation column, the dividing wall distillation column further comprising an upper section disposed above the middle section and a lower section disposed below the lower section, and the middle section separated into two portions by a wall extending through the middle section from the upper section to the lower section;
    blocking a flow of liquid from the upper section to the middle section with a liquid barrier;
    blocking both a flow of liquid from the middle section to the lower section and a flow of vapor from the lower section to the middle section with a vapor and liquid barrier such that a pressure in a first portion of the middle section is independent of a pressure in a second portion of the middle section;
    recovering a first product stream from the upper section;
    recovering a second product stream from the middle section; and,
    recovering a third product stream from the lower section,
    wherein the dividing wall precludes liquid accumulating on a top of the vapor and liquid barrier within the two portions of the middle section from mixing.

16. The process of claim 15, wherein the hydrocarbon feed stream is passed into one of the two portions of the middle section, and wherein the second product stream is recovered from the other of the two portions of the middle section.

17. The process of claim 15 wherein a vapor is passed from the lower section to the middle section with at least two vapor flow conduits.

18. The process of claim 17 wherein a first vapor flow conduit passes the vapor from the lower section to the first portion of the middle section, and wherein the second vapor flow conduit passes the vapor from the lower section to the second portion of the middle section.

19. The process of claim 18 wherein a pressure of the first portion is different than a pressure of the second portion.

20. The process of claim 15, further comprising at least one of:
    sensing at least one parameter of the process and generating a signal or data from the sensing; and
    transmitting the signal; or
    transmitting the data.

* * * * *